June 27, 1939.   L. D. SOUBIER   2,164,093
METHOD OF JOINING GLASS BLOCK SECTIONS
Filed July 2, 1936    4 Sheets—Sheet 1
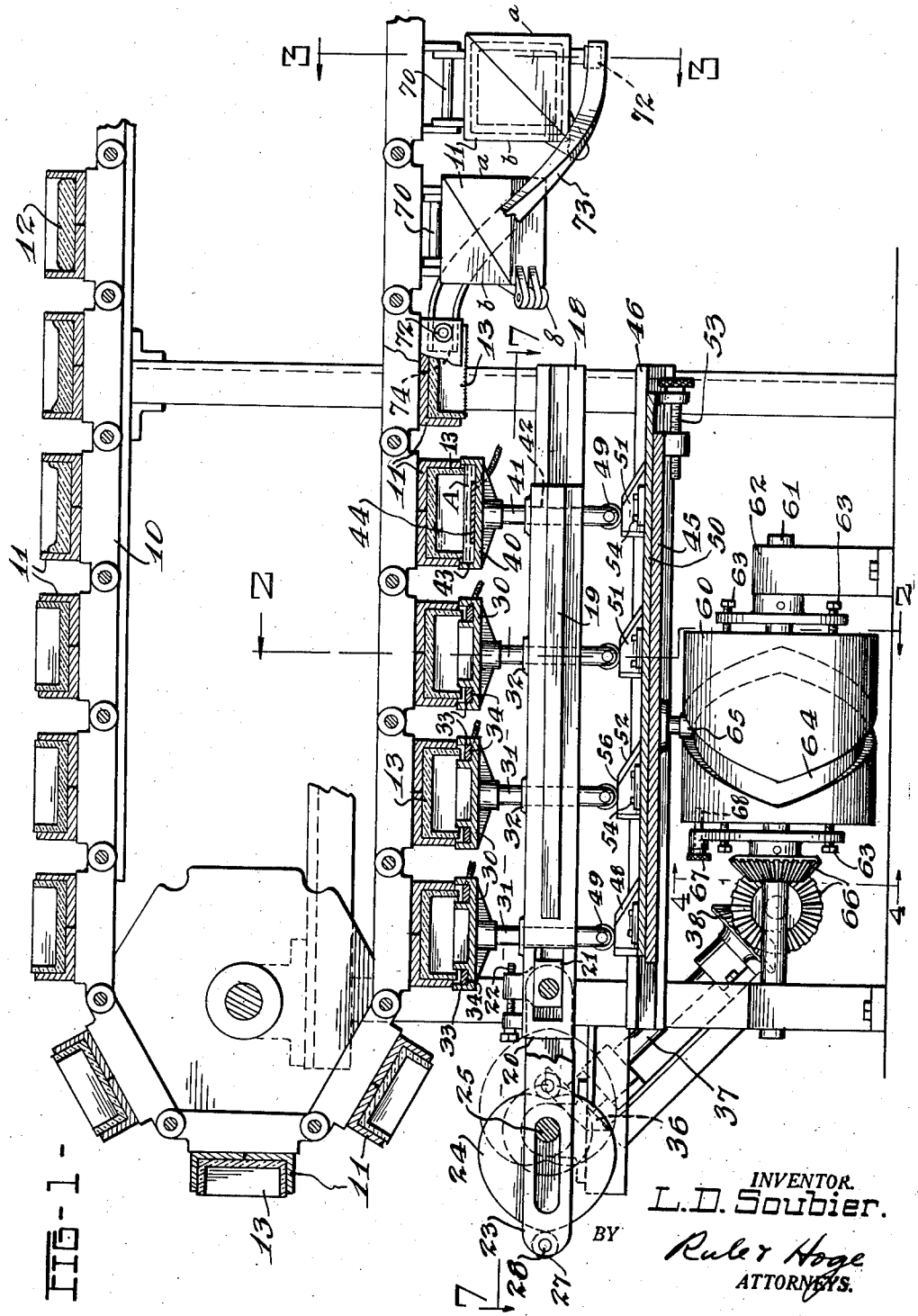
INVENTOR.
L.D. Soubier.
BY
Ruler Hoge
ATTORNEYS.

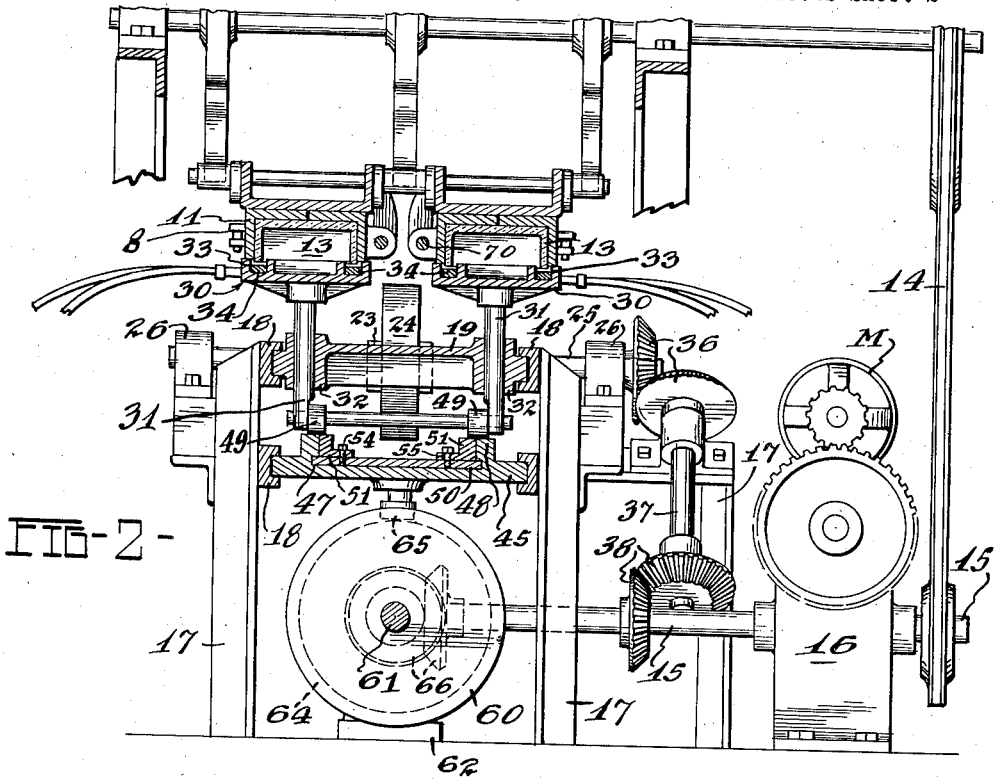
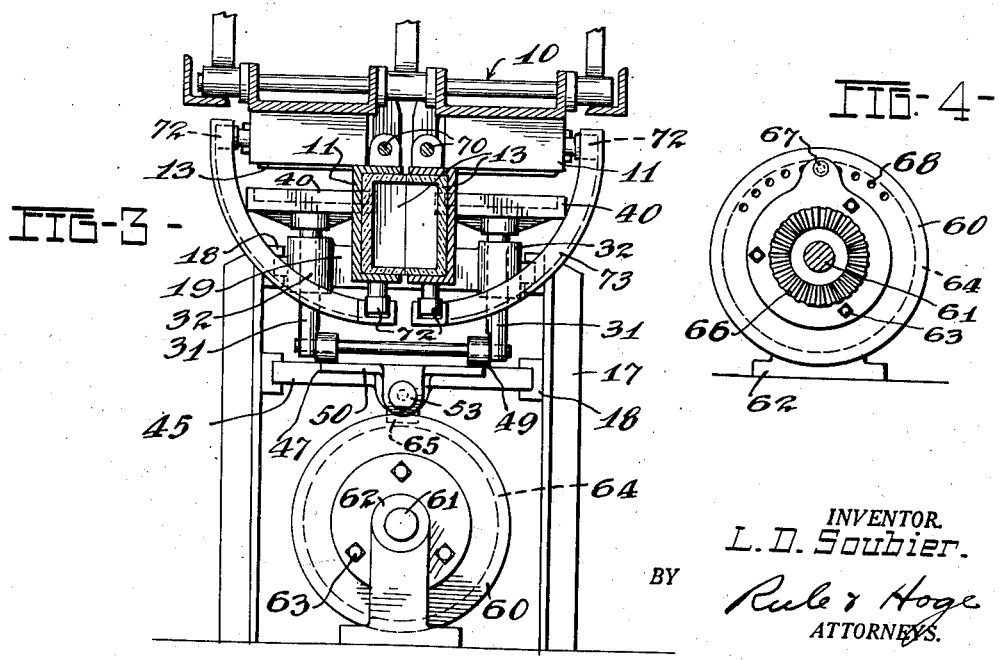

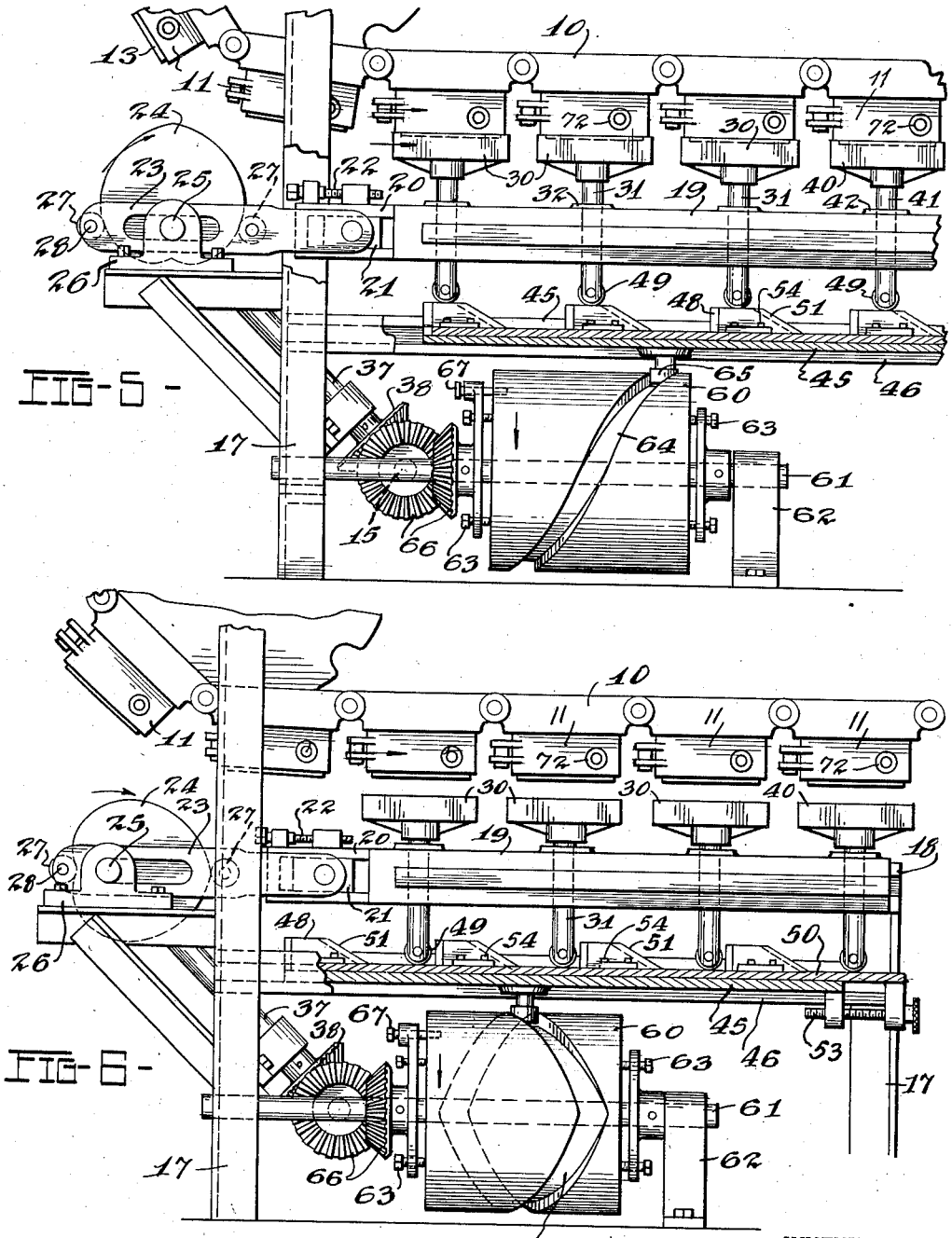

June 27, 1939. L. D. SOUBIER 2,164,093
METHOD OF JOINING GLASS BLOCK SECTIONS
Filed July 2, 1936 4 Sheets-Sheet 4
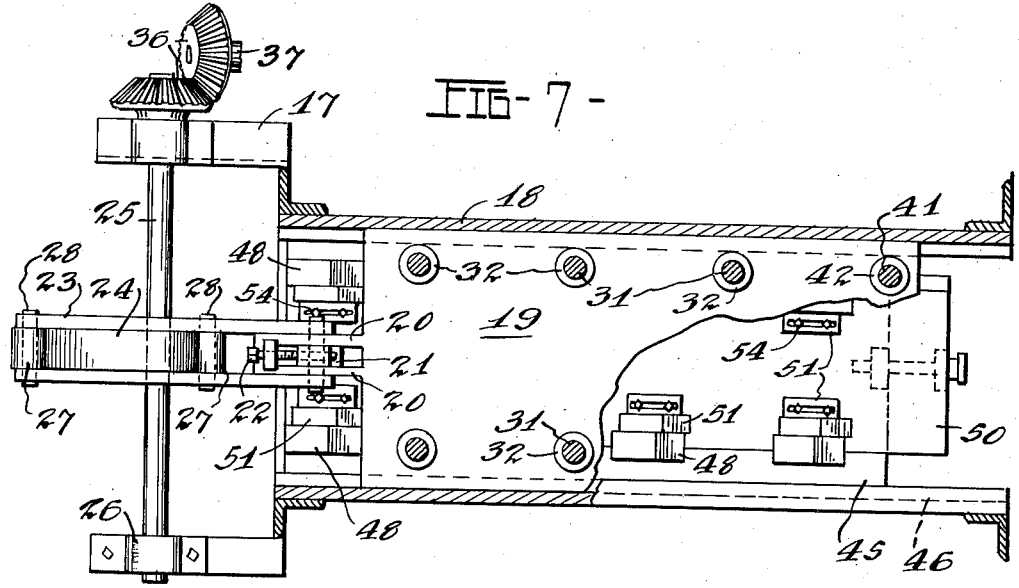
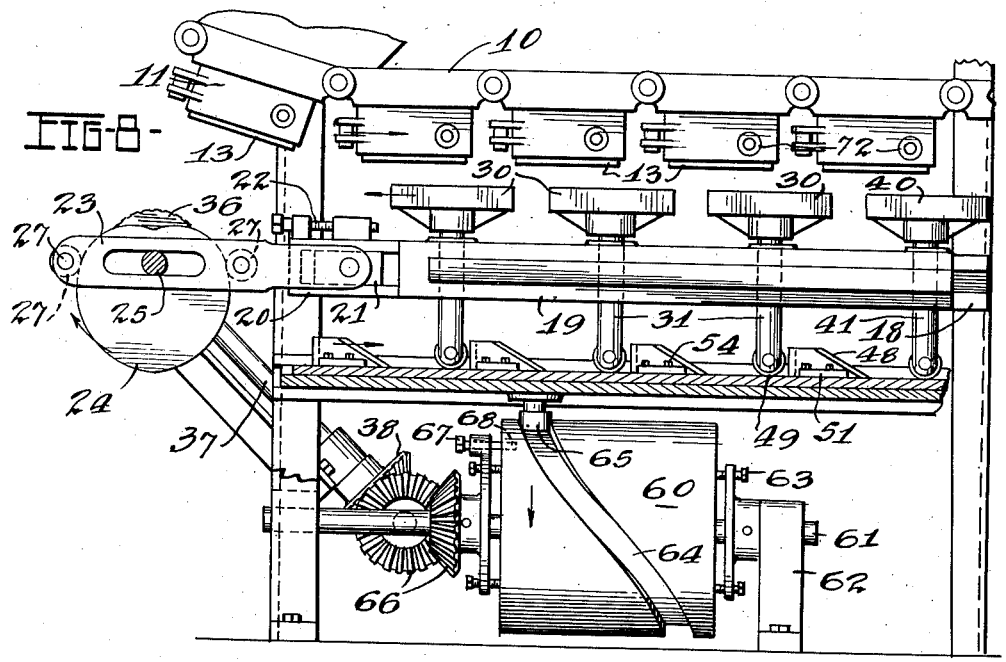
INVENTOR.
L.D. Soubier.
BY
Rule & Hoge
ATTORNEYS.

Patented June 27, 1939

2,164,093

UNITED STATES PATENT OFFICE 2,164,093

METHOD OF JOINING GLASS BLOCK SECTIONS

Leonard D. Soubier, Toledo, Ohio, assignor to Owens-Illinois Glass Company, a corporation of Ohio Application July 2, 1936, Serial No. 88,650

2 Claims. (Cl. 49—81)

The present invention relates to glassware forming machines, and more particularly to a method of and an apparatus for joining together the edges of preformed sections of structural hollow glass building blocks to form the completed articles.

The principal object of the invention is to provide an apparatus which is entirely automatic in its operation and which will effectively reheat the edges of the preformed sections as they issue from the forming dies of a glass block forming machine, which will apply to the reheated edges a suitable bonding medium, and which will finally unite the reheated and coated edges of adjacent sections to form the completed, hollow, hermetically sealed, and at least partially vacuumized structural glass building blocks.

Another object of the invention is the provision of novel means for preparing preformed building block sections for joining together. To this end the block sections have certain edge portions thereof dipped into a bath of molten bonding medium while continuously moving along a given path and the bath of bonding medium is caused to move at the same speed and in at least approximately the same direction as the block sections. This facilitates coating and reheating of these edge portions.

In utilizing such an apparatus in the manufacture of the glass blocks, it is found necessary during the operation thereof to adjust one or more of the various operations relative to the others in order that glassware of a high standard of quality may be consistently produced. Accordingly, it is an object of the invention to provide a means for adjusting certain cam mechanisms which are employed for controlling the various operations of the apparatus.

Other objects of the invention will appear hereinafter.

In the accompanying four sheets of drawings:

Fig. 1 is a fragmentary side elevational view, partly in section, of an apparatus manufactured in accordance with the principles of the invention;

Fig. 2 is a sectional view taken substantially along the line 2—2 of Fig. 1;

Fig. 3 is a sectional view taken substantially along the line 3—3 of Fig. 1;

Fig. 4 is a sectional view taken substantially along the line 4—4 of Fig. 1;

Fig. 5 is a fragmentary side elevational view of a portion of the apparatus showing a series of movable heating and coating elements in operative engagement with the traveling molds of a forming machine;

Fig. 6 is a fragmentary side elevational view similar to Fig. 5 showing the heating elements in the course of shifting from one set of molds to another set thereof in the progressive heating of the edges of the block half-sections;

Fig. 7 is a sectional view taken substantially along the line 7—7 of Fig. 1; and Fig. 8 is a fragmentary side elevational view similar to Figs. 5 and 6 showing the heating and coating elements in another position thereof.

The present invention may be embodied in, and form a part of, a glass block forming machine, the details of which are not disclosed in this application but which includes an endless conveyor 10 comprised of hingedly connected conveyor sections 9, provided with a series of traveling sectional molds 11 hingedly carried by the respective conveyor sections 9 and in which charges 12 of molten glass are formed into half-sections 13 of the finished blocks and which become inverted with the preformed half-sections contained therein as shown in Figs. 1, 2, 5, 6 and 8.

After the molds 11 have become inverted, they no longer function in the apparatus as molds but instead, they function as supports for moving the half-sections 13 in their respective paths. Each mold 11 (Fig. 1) consists of a pair of separable mold sections $a$ and $b$ hinged together as at 8 and adapted when closed upon each other to frictionally retain the half sections 13 therebetween against gravitational pull when the mold 11 is inverted.

The conveyor 10 is driven by means of a belt and pulley arrangement 14 (Fig. 2) from a horizontal shaft 15 which is driven by a motor M operating through a speed reduction device 16.

Suitably supported from the framework 17 of the forming machine, are a pair of parallel, longitudinally extending, channel-shaped guides 18 (Figs. 1, 2 and 6) which support therebetween a horizontally reciprocating carriage 19. One end of the carriage 19 is provided with a slotted extension 20 (Fig. 5) in which there is adjustably disposed a cross-head 21, an adjusting screw 22 being provided for shifting the position of the cross-head 21 in the extension 20 to vary the position of the carriage 19 longitudinally in the apparatus. The cross-head 21 is operatively connected by means of connecting rods 23 to an actuating heart cam 24 mounted on a shaft 25 rotatably journalled in bearing 26 carried by the framework 17. The cam 24 bears against a pair of cam followers in the form of rollers 27 supported on stub shafts 28 extending between the connecting rods 23. Rotation of the cam 24 about the axis of the shaft 25 causes reciprocation of the carriage 19 by virtue of the camming action brought to bear alternately on the followers 27.

The cam 24 is actuated in timed relation to the movement of the conveyor 10, and, accordingly, the shaft 25 (Fig. 2) is driven through bevel gears 36 from a shaft 37 which, in turn, is driven through bevel gears 38 from the shaft 15. The cam 24 is designed in such a manner that, upon uniform rotation thereof at a speed determined by the character of the gears 36 and 38, motion of the carriage 19 forwardly, in the direction of travel of the inverted molds 11, is synchronized with the motion of the molds and occurs at the same rate of speed.

A plurality of heating units 30 (Fig. 1), arranged in pairs, are mounted for vertical sliding movement in the carriage 19 by means of stems 31 which are slidable in guides 32 provided in the carriage 19. The units 30 are designed for progressively reheating the projecting edges of the half-sections 13 in the molds 11 and toward this end they are provided with open-ended rectangular heating chambers 33 having coextensive rectangular electrical heating elements 34 disposed therein. Upon movement of the units 30 to their uppermost position in the carriage 19, the heating elements are brought into close proximity to the edges of the half-sections carried by the respective molds 11 with the open ends of the units contacting the open inverted ends of the molds. Thus, in the elevated position of the heating units 30, the rectangular heating chambers 33 envelop the projecting edges of the half-sections 13 with the heating elements in close proximity thereto and in this manner, the heating units and molds travel together at precisely the same rate of speed through a portion of each cycle of operation of the apparatus. The importance of such timing of these speeds of travel will be apparent presently.

A pair of coating units 40, designed for successive cooperation with the molds in coating the reheated edges of the half-sections with a bonding medium, are mounted for vertical sliding movement in the carriage 19 by means of stems 41 which are slidable in guides 42 provided in the carriage 19. The units 40 each includes an open-ended rectangular reservoir 43 adapted to contain therein a suitable bonding medium, as, for example, molten aluminum A which is maintained in its molten state by means of a heating element 44.

In the elevated position of the coating units 40, as shown in Fig. 1, the projecting edges of the half-sections 13 in the molds 11 extend into the reservoir 43 below the level of the molten aluminum and become thoroughly coated therewith. The coating units travel forwardly with the successive molds during a portion of each cycle of reciprocation of the carriage 19. Inasmuch as the edges of the glass half-sections are extremely hot at the time the bath of molten aluminum is applied thereto, a chemical and mechanical bond is created between the glass and aluminum, the chemical bond arising in part from the chemical reaction and combination between the free alkali in the glass and the aluminum.

While any suitable number of pairs of reciprocating heating units 30 may be employed for cooperation with as many pairs of molds 11, three such pairs have been deemed suitable for illustration of the principles involved. As the carriage 19 reaches the limits of its stroke in the direction of travel of the molds 11, means is provided for lowering the heating units 30 and coating units 40 by the action of gravity away from the molds 11 to permit shifting of the lowered units into position for engagement with the last three molds which have become inverted in the forming machine. Thus, each return stroke of the carriage 19 causes shifting of the lowered units and brings a succeeding pair of molds into the range of the heating units 30 in alignment with the first unit of the series. In this manner the pairs of molds are progressively brought into operative engagement with each of the pairs of heating units and the edges of the half-sections are progressively heated thereby prior to becoming coated with the bonding medium contained in the reservoirs 43 of the coating units 40.

The means for lowering the heating units 30 and the coating units 40 are best illustrated in Fig. 1 and consist in a reciprocable cam-supporting carriage 45, slidable in guides 46 supported in the framework 17. The carriage 45 is provided with a shallow central longitudinal groove 47, from the sides of which there project upwardly a series of raised cams 48 having inclined portions 52 and upper horizontal portions 56. The cams 48 are arranged in pairs and designed for cooperation with the lower ends of the stems 31 of the heating units 30 and the stems 41 of the coating units 40 in elevating these units for cooperation with the molds 11 in the manner previously described. Toward this end, the lower ends of the stems 31 and 41 are provided with rollers 49 adapted to travel up or down on the respective cams 48 upon relative movement between the carriages 19 and 45.

In order to vary the effective length of the cams 48 collectively, a slide 50 is mounted for longitudinal adjustment in the groove 47. A plurality of cam extensions 51 project upwardly from the slide 50 in the proximity of the cams 48. An adjusting screw 53 for adjusting the longitudinal position of the slide 50 with respect to the carriage 45 serves to adjust the effective length of the cams 48 collectively to vary the duration of exposure of the edges of the half-sections to the heating elements 34 and to control the length of time the edges are exposed to the molten aluminum. The effective length of the cams 51 may be individually adjusted by means of cap-screws 54 which extend through slots 55 provided in the cam extensions 51. Thus, the duration of exposure of the edges of successive half-sections with respect to any individual heating unit 30, or the duration of exposure of the edges to either of the coating units 40 may be independently varied.

In order to reciprocate the cam carriage 45 in timed relation to the reciprocation of the carriage 19 and to the movement of the conveyor 10, a cylindrical cam member 60 (Fig. 1) in the form of a drum is positioned beneath the carriage 45. The cam member 60 is mounted on a horizontal shaft 61 supported in bearings 62 and is capable of limited axial adjustment on the shaft 61 by means of a series of adjusting screws 63. A cam track 64, provided on the surface of the member or drum 60, cooperates with a cam follower 65 or roll in causing reciprocation of the carriage 45 upon rotation of the drum. The drum 60 is driven in timed relation to the cam 24 and accordingly, the shaft 61 upon which the drum is mounted is driven from the shaft 15 by means of meshing bevel gears 66 (Fig. 1).

As shown in Fig. 4, a pin 67, which is designed for selective cooperation with a series of apertures 68 arranged in arcuate fashion near the perimeter of the drum 60, permits the cycle of reciprocation of the carriage 45 to be advanced or retarded with respect to the cycle of reciprocation of the carriage 19.

The nature of the cam track 64 is such that at the commencement of the operative forward stroke of the carriage 19, as shown in Fig. 1, the carriage 45 occupies a medial position in its forward stroke with the rollers 49 mounted on the horizontal portions 56 of the cams 48 and with the heating and coating units 30 and 40 in operative engagement with the molds 11 as shown.

During the first quarter-cycle of the apparatus, the cam members 24 and 60 each rotate ninety degrees and assume the positions shown in Fig. 5. Thus, at the end of the first quarter-cycle, the carriage 45 reaches the end of its forward stroke while the carriage 19 moves to a medial position in the forward stroke thereof. In so moving, the forward strokes of the two carriages overlap and the rollers 49, riding on the elevated horizontal portions 56 of the raised cams 48, maintain the heating and coating units 30 and 40 in traveling contact with the molds 31.

During the second quarter-cycle of the apparatus, the cam members 24 and 60 again rotate ninety degrees and assume the position shown in Fig. 6. In this position, the carriage 19 reaches the end of its operative forward stroke while the carriage 45 assumes a medial position in the return stroke thereof. Thus, during this quarter-cycle, the raised cams 48 are withdrawn from beneath the rollers 49 which pass down the inclined portions 52 thereof and cause the heating and coating units 30 and 40 to be lowered from contact with the molds 31.

During the third quarter-cycle of the apparatus, the cam members 24 and 60 progress ninety degrees and assume the position shown in Fig. 8 with the carriage 19 in the middle of its inoperative return stroke and with the carriage 45 in its fully retracted position at the end of its return stroke. The raised cams 48 are disengaged from the rollers 49 as shown.

During the last quarter-cycle of the apparatus, the cam members 24 and 60 again progress ninety degrees and assume the original position shown in Fig. 1. In this last quarter-cycle, the carriage 45 in commencing its forward stroke causes the raised cams 48 to meet the returning rollers 49 which ride upwardly on the inclined portions 52 thereof, thus elevating the heating and coating units 30 and 40 as the carriage 19 approaches the limit of its return stroke.

During each entire cycle of the apparatus, the conveyor 10 advances the inverted series of molds so that each mold moves to the position formerly occupied by the next preceding mold at the beginning of the cycle. Thus, as the units 30 and 40 are elevated at the completion of each cycle, successive operative engagement with the molds is effected for progressively heating the projecting edges of the half-sections carried thereby. The successive pairs of molds 11, after operative engagement with the last pair of heating units 30 of the series, are subsequently engaged by the pair of coating units 40 and the projecting heated edges of the half-sections carried thereby are treated with the molten aluminum as previously described.

Reference to Fig. 3 discloses the manner in which the heated and coated edges of the half-sections 13, carried by the adjacent inverted molds 11 of each pair on the conveyor 10, are joined together. The inverted molds 11 of each pair on the conveyor 10 are hinged adjacent their opposed inner sides as at 70 for downward swinging movement toward each other in such a manner as to bring the molds into juxtaposition with the coated edges of the half-sections 13 in abutting relation and under pressure as shown in Fig. 3.

Each mold is provided on its outer free side with a projecting follower 72. A pair of downwardly inclined guides 73, suitably supported on the framework 17, have their upper ends 74 in alignment with the path of travel of the followers 72 as the molds proceed on the conveyor 10 from the coating operation. The followers 72, upon entering the upper open ends of the guides 73 are carried downwardly in the progress of the molds on the conveyor. The molds of each pair are thus swung downwardly toward each other and the projecting heated and coated edges of the half-sections carried thereby are brought into engagement under pressure applied by the guides 73 for permanent joining together in the formation of the completed block.

Under certain conditions of manufacture, it is desirable to unite the half-sections of the blocks by a glass-to-glass bond between the edge portions thereof. In order to accomplish this, it is necessary that the edge portions be brought to a plastic state by the localized application of intense heat thereto. Such localized heating may be effected by filling the reservoirs 43 of the units 40 with a molten material which will not adhere to the glass and which is of sufficiently high temperature to render the edge portions plastic. The material employed may be a suitable metal, such as molten lead, which has a high melting point and which does not have an affinity in its molten state for glass.

It is to be noted that by virtue of the provision of a means 53 for individually or collectively varying the duration of operative engagement between the molds and both the heating and coating units, a means for shifting the operative limits within which the carriage 19 reciprocates, a means for shifting the operative limits within which the carriage 45 reciprocates, and a means for advancing or retarding the reciprocation of the carriage 45 with respect to the carriage 19, a flexible apparatus designed to meet varying engineering exigencies in the manufacture of the hollow glass building blocks is provided.

Modifications may be resorted to within the spirit and scope of the appended claims.

I claim:

1. The method of joining the edges of preformed sections of hollow glass building blocks which travel in molds toward the discharge end of a forming machine, which consists in submerging the edges of the traveling sections in a pool of molten metal while moving said pool in the same direction and at the same rate of speed as said edges to coat the same, causing said edges to be withdrawn from said pool and subsequently contacting said edges, one with another.

2. The method of joining sections of glass building blocks, which travel in supports moving in separate paths, which consists in submerging the edges of said sections in a pool of molten metal, causing a coincidence of travel of said sections and said metal, withdrawing said sections from the metal, subsequently positioning the said sections for bonding contact, and applying pressure to said sections.

LEONARD D. SOUBIER.